(12) United States Patent
Kunii

(10) Patent No.: US 7,440,204 B2
(45) Date of Patent: Oct. 21, 2008

(54) ND FILTER OF OPTICAL FILM LAMINATE TYPE WITH CARBON FILM COATING

(75) Inventor: Koki Kunii, Koriyama (JP)

(73) Assignee: Nidec Copal Corporation, Tokyo (JP)

( * ) Notice: Subject to any disclaimer, the term of this patent is extended or adjusted under 35 U.S.C. 154(b) by 285 days.

(21) Appl. No.: 11/227,205

(22) Filed: Sep. 16, 2005

(65) Prior Publication Data

US 2006/0061867 A1    Mar. 23, 2006

(30) Foreign Application Priority Data

Sep. 17, 2004    (JP) .............................. 2004-271713

(51) Int. Cl.
G02B 5/22    (2006.01)
(52) U.S. Cl. ...................... 359/888; 359/885
(58) Field of Classification Search ............... 359/888, 359/360, 585
See application file for complete search history.

(56) References Cited

U.S. PATENT DOCUMENTS 5,715,103 A    2/1998  Amano et al.
6,034,820 A *  3/2000  Someno et al. ............. 359/585
6,671,109 B2* 12/2003  Kunii ......................... 359/888
6,842,302 B2*  1/2005  Nakajima et al. ........... 359/888

FOREIGN PATENT DOCUMENTS

JP    52-113236    9/1977
JP    07-063915    3/1995

* cited by examiner

*Primary Examiner*—Audrey Y Chang
(74) *Attorney, Agent, or Firm*—Roberts Mlotkowski Safran & Cole, P.C.; Thomas W. Cole

(57) ABSTRACT

An ND filter is composed of a transparent substrate, a laminate of a light-absorbing film and a dielectric film formed on the transparent substrate, and a carbon film formed to clad a surface of the laminate of the light-absorbing films and the dielectric films. Depending on cases, another carbon film is also formed on a reverse side of the transparent substrate. The carbon film is formed by a deposition process at a deposition temperature ranging from a room temperature to 150° C. The light-absorbing film is formed of a mixture of metal and compound thereof, a material of the metal being selected from a group consisting of Ti, Cr, Ni, NiCr, NiFe, and NiTi. The dielectric film is formed of $SiO_2$ or $Al_2O_3$.

9 Claims, 7 Drawing Sheets

FIG. 4

| DEPOSITION CONDITION | | SUBSTRATE TEMPERATURE | 100°C |
|---|---|---|---|
| | | ULTIMATE VACUUM | 1×10⁻³Pa |
| Ti | | EVAPORATION RATE | 0.5~1nm/sec |
| | | EVAPORATION VACUUM | 3~4×10⁻³Pa |
| | | SUPPLIED GAS | Air (N₂:O₂=4:1) |
| SiO₂ | | EVAPORATION RATE | 0.5~1nm/sec |
| | | SUPPLIED GAS | — |

ND FILTER OF OPTICAL FILM LAMINATE TYPE WITH CARBON FILM COATING

BACKGROUND OF THE INVENTION

1. Technical Field

The present invention relates to an ND filter. The ND (neutral density) filter is used for stopping a part of incident light so as to decrease the amount of transmitting light uniformly over an entire visible range.

2. Related Art

Generally, when the brightness of an object is too high for an imaging system such as a camera and a video, even if an aperture stop is minimized (namely, an aperture diameter is minimized), the aperture stop may still allow an excessive amount of incident light to enter into a light-sensitive surface. To solve this problem, it is a common practice to attach an ND filter to a part of the imaging system so as to limit the amount of light incident on the light-sensitive surface. In this case, the ND filter has flat spectral characteristics of simply decreasing the amount of incident light, and therefore needs to ensure uniform transmittance over an entire visible range of wavelength. Until now, a plastic film-based ND filter has been used for the imaging system such as a camera and a video in order to uniformly decrease the amount of light over the entire visible range.

In recent years, there have been used thin-film laminated ND filters excellent in optical characteristics and durability as disclosed in Patent Documents 1 through 3.

[Patent Document 1] Japanese Patent Laid-Open Publication No. Sho 52-113236

[Patent Document 2] Japanese Patent Laid-Open Publication No. Hei 07-063915

[Patent Document 3] Japanese Patent Laid-Open Publication No. 2003-043211

Patent document 1 discloses the ND filter composed of alternate layers of a metal thin film (Ti, Ni, and the like) and a dielectric film ($MgF_2$). That is, according to patent document 1, the metal film is used as a light-absorbing film.

Patent document 2 discloses an ND filter composed of alternate layers of two types or more of Ti metal-oxide films (with extinction coefficient k ranging from 1.0 to 3.0) and dielectric films ($Al_2O_3$, $SiO_2$, and $MgF_2$). Patent document 2 uses lower oxides of Ti (TiO, $Ti_2O_3$, $Ti_3O_5$, $Ti_4O_7$, and the like) as starting materials for the absorbing films composed of two types or more of Ti metal-oxide films.

Patent document 3 discloses a thin-film ND filter composed of a light-absorbing film and a dielectric film laminated on a transparent substrate such as a plastic film. The light-absorbing film is made of a metal material and is formed by evaporation. The light-absorbing film is formed by introducing oxygenic mixed gas during the deposition, and contains a metal oxide generated by maintaining the degree of vacuum.

As described in any of patent documents 1 through 3, the thin-film laminated ND filter is composed of a metal light-absorbing film and an inorganic insulation dielectric film laminated on a transparent substrate such as a plastic film. Accordingly, the outmost surface layer of the lamination is formed by either of the metal light-absorbing film or the inorganic-insulation dielectric film. When the metal light-absorbing film is used for the outmost layer, however, the outmost layer is easily flawed and therefore becomes less abrasion-resistant. When the inorganic insulation dielectric film is used for the outmost layer, by contrast, the outmost layer more excels in the abrasion resistance but is easily electro-statically charged. The static electricity collects dust, causing the yield rate of the product to decrease. That is, using the dielectric film for the outmost layer degrades the anti-electrostatic property.

SUMMARY OF THE INVENTION

The present invention has been made in consideration of the foregoing. It is therefore an object of the present invention to provide a thin-film laminated ND filter excellent in abrasion resistance and an anti-electrostatic property. The following measures are taken to achieve this object.

That is, the present invention provides an ND filter comprising: a transparent substrate; a light-absorbing film and a dielectric film laminated on the transparent substrate; and a carbon film formed to clad a surface of a laminate of the light-absorbing film and the dielectric film.

Depending on cases, another carbon film is also formed on a reverse side of the transparent substrate, which is opposite to a front side of the transparent substrate where the laminate is formed. The carbon film is formed by a deposition process at a deposition temperature ranging from a room temperature to 150° C. Preferably, the light-absorbing film comprises a mixture of metal and compound thereof, a material of the metal being selected from a group consisting of Ti, Cr, Ni, NiCr, NiFe, and NiTi. The dielectric film comprises $SiO_2$ or $Al_2O_3$. The transparent substrate comprises a resin film transparent in a visible wavelength range. Such an ND filter is used for aperture devices, for example.

According to the present invention, the ND filter is composed of a light-absorbing film and a dielectric film laminated on a transparent substrate, in which a carbon film is formed as a protective film. As generally known, the carbon film has the diamond structure, the DLC (Diamond Like Carbon) structure, or the graphite structure. The carbon film excels in the abrasion resistance because of the dense composition and a high degree of hardness. Compared to inorganic insulative dielectric films, the carbon film shows a low surface resistance and has an anti-electrostatic property. The carbon film having these characteristics is formed as an outmost layer of the ND filter, and makes it possible to provide a product that is scratch resistant and hardly catches foreign particles. Generally, a protective film formed as the outmost layer needs to have no effects on ND filter's optical characteristics. With this respect, the carbon film has not only the excellent abrasion resistance and anti-electrostatic property, but also practical transparency in a visible range. Therefore, the carbon film is appropriate as a protective film for the ND filter. In addition, due to the dense composition, the carbon film has the high abrasion resistance and a small friction coefficient. In case that the ND filter is attached to a movable part of the aperture device, for example, cladding the surface with the carbon film can decrease the friction coefficient and prevent malfunctions.

BRIEF DESCRIPTION OF THE DRAWINGS

FIG. 4 is a table diagram showing deposition conditions for the ND filter according to the present invention.

DETAILED DESCRIPTION OF THE INVENTION

Figure 1:
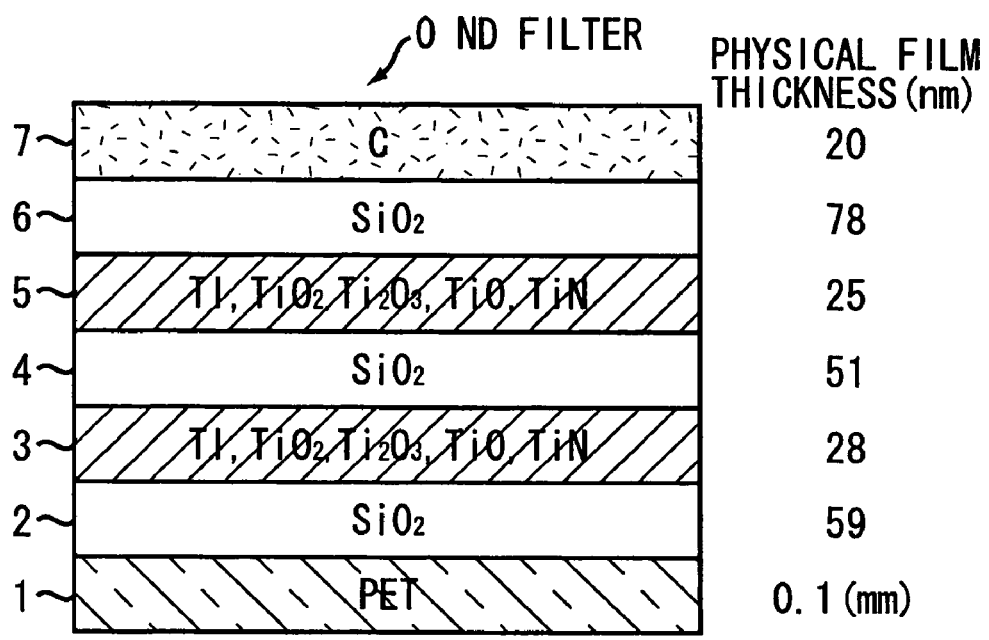
FIG. 1 is a schematic section view showing the layer configuration of an ND filter according to the present invention.

Embodiments of the present invention will be described in further detail with reference to the accompanying drawings. FIG. 1 is a schematic sectional view showing the configuration of a thin-film ND filter according to the present invention. As shown in FIG. 1, an ND filter 0 is a thin film type formed by laminating light-absorbing films 3 and 5 and dielectric films 2, 4, and 6 on a transparent substrate 1. Characteristically, a carbon film 7 is formed to clad the surface of the laminate. According to needs, it may be preferable to form another carbon film on the rear side of the transparent substrate 1. Preferably, the carbon film 7 is formed by the deposition process such as CVD or PVD at the deposition temperature of 150° C. or less. The light-absorbing films 3 and 5 are composed of a mixture of metal and compound thereof. For example, the metal material is Ti. Instead, it may be preferable to choose from Cr, Ni, NiCr, NiFe, or NiTi. The dielectric films 2, 4, and 6 are used as an inorganic insulation material and may be made of $SiO_2$. Instead, it may be preferable to use $Al_2O_3$. The transparent substrate 1 is made of a resin film (e.g., PET) transparent in the visible wavelength range. The thin-film ND filter 0 according to the above-mentioned configuration is used for an aperture device of camera, for example.

With further reference to FIG. 1, the following describes the specific film configuration of the ND filter 0. The transparent substrate 1 is composed of PET (polyethylene terephthalate) with a thickness of 0.1 mm. However, the present invention is not limited thereto and is applicable to polyester films and polycarbonate films other than PET. Polyester films and polycarbonate films such as PET are preferable for aperture devices. For other uses, the transparent substrate 1 may be appropriately composed of glass or plastic that is transparent in working wavelength areas. Generally, the transparent substrate 1 is formed of an insulating material such as plastic or glass, and therefore it is easily electro-statically charged. Without any anti-electrostatic treatment, the static electricity may catch foreign particles and the like and may damage the filter function.

A first dielectric film 2 is formed on the transparent substrate 1 and is composed of $SiO_2$ with a physical film thickness of 59 nm. A first light-absorbing film 3 is deposited thereon and is composed of a mixture of the metal Ti and its compounds. The Ti metallic compound contains saturated oxide $TiO_2$ as a major component and by-product materials such as lower oxides $Ti_2O_3$ and TiO and nitride TiN as residual components. The first light-absorbing film 3 has a physical film thickness of 28 nm. A second dielectric film 4 is deposited thereon and is composed of $SiO_2$ with a physical film thickness of 51 nm. A second light-absorbing film 5 is deposited thereon and likewise contains metal Ti and its saturated oxide $TiO_2$ as major components and lower oxides $Ti_2O_3$ and TiO and metal nitride TiN as minor or residual components. The second light-absorbing film 5 has a physical film thickness of 25 nm. A third dielectric film 6 is deposited thereon and is composed of $SiO_2$ with a physical film thickness of 78 nm. This layer configuration is only an example and does not limit the scope of the present invention. In terms of optical thin films, the dielectric film represents a ceramic material transparent at a normal working wavelength. The dielectric films are laminated at thickness several times as great as the wavelength, causing an optical interference effect to freely adjust optical characteristics such as an amount of reflection, amount of transmission, polarization, phase, and the like. The embodiment uses the layer configuration in FIG. 1 to provide the ND filter with an anti-reflection function. On the other hand, the light-absorbing film literally absorbs light in a working wavelength area. Normally, metal is used for the light-absorbing film in the visible range. The present invention improves optical characteristics and physical characteristics by especially introducing a metallic compound containing saturated oxide of an elementary metal substance of the light-absorption film.

The dielectric film 6 is composed of $SiO_2$ and forms the top layer of the laminate constituting the ND filter 0. The dielectric film 6 is an inorganic insulator and therefore it reveals a relatively high surface resistance. Accordingly, the dielectric film 6 is easily electro-statically charged, and without any treatment, it may catch foreign particles. The inorganic dielectric film 6 shows a certain degree of hardness compared to the light-absorbing film 5 composed of the metal and its compound, but still may be flawed. To solve this problem, the present invention uses the carbon film 7 to clad the outmost layer of the ND filter 0. The carbon film 7 excels in the abrasion resistance and the anti-electrostatic property, and functions as an excellent surface protective film for the ND filter 0. The carbon film 7 has a thin physical thickness of 20 nm, for example. The carbon film 7 is optically transparent in general and colorless, and therefore has no adverse effect on optical characteristics of the ND filter 0.

As generally known, the carbon film 7 has the diamond structure, the DLC structure, or the graphite structure. The present invention is applicable to carbon films having any of these structures as a protective film for the ND filter 0. The carbon film needs to be formed as thick as approximately 20 nm so as to function as a protective film. From the viewpoint of the optical design, a preferable film structure is to cause little influence on optical characteristics of the ND filter at a protective film thickness up to 20 nm. Alternatively, if an influence is caused, a preferable film structure is to indicate an extinction coefficient small enough to suppress a variation by adjusting the thickness of the dielectric film or the light-absorbing film. Further, from the viewpoint of the abrasion resistance, a preferable film structure is to indicate high adherence and hardness and a small friction coefficient. From the above-mentioned viewpoints, the carbon film 7 is preferably composed of a DLC film fabricated by the plasma CVD. Especially, the plasma CVD is capable of forming DLC films at a process temperature lower than or equal to 150° C., i.e., approximately 100° C., and therefore it ensures the heat resistance of the transparent substrate 1. In case that the transparent substrate 1 is composed of a plastic film, it is possible to prevent heat deformation or separation between laminated layers by keeping the deposition temperature from the room temperature to 150° C. or lower, preferably up to approximately 100° C. The process temperature, if exceeding 150° C., increases the heat contraction amount of the film substrate or causes deformation due to heat. A higher process temperature over 200° C. may cause heat decomposition of the film substrate. Depending on cases, it may be preferable to form an undercoat of SiC and the like to increase the adherence of the DLC film to the transparent substrate 1. The undercoat can be deposited by sputtering process or a low-temperature process using CVD. In this specification, the low-temperature process is deemed as a deposition temperature of 150° C. or lower. In this manner, forming the carbon film 7 as the outmost layer of the laminate for the ND filter 0 improves the abrasion resistance of the ND filter 0. In addition, decreasing the friction coefficient reduces possibilities of causing malfunctions. Further, decreasing the surface resistance prevents foreign particles from being attached.

As mentioned above, it is preferable to use, for example, a hard DLC film for the carbon film 7 to protect the surface of the ND filter 0. Conventionally, it is a general practice to deposit DLC films using the sputtering method. To thin the DLC film, however, the sputtering method may degrade the coating property to expose the surface of the underlying layer. To solve this problem, it is preferable to form DLC films using the CVD method that provides more excellent coating property than the sputtering method. The CVD method has an advantage of being capable of forming harder DLC films than the sputtering method. Especially, the use of the plasma CVD method enables the low-temperature process to form DLC films. Generally, when the plasma CVD method is used for thin film formation, plasma cleaning is performed on the substrate surface before the thin film formation. This can improve the adhesion between a film and the substrate. The plasma cleaning on the substrate surface uses the discharge gas, i.e., rare gas such as argon.

Figure 2:
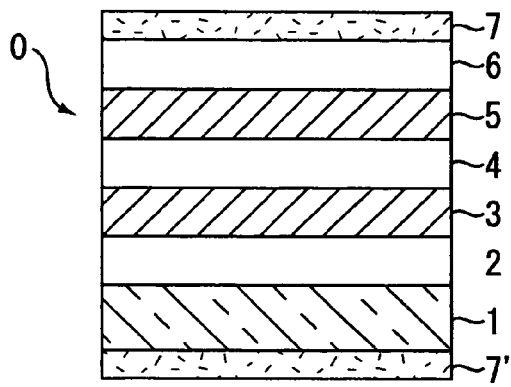
FIGS. 2(A), 2(B) and 2(C) are schematic section views showing other embodiments of the ND filter according to the present invention.
Figure 2:
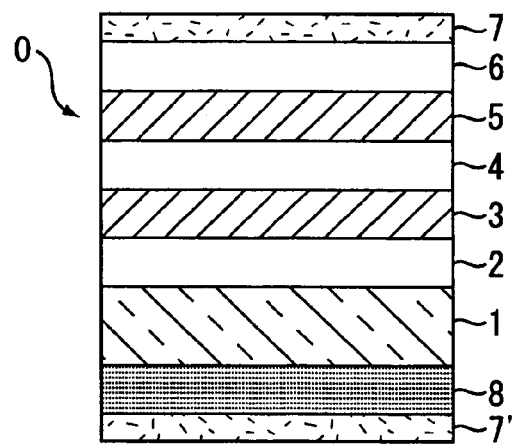
Figure 2:
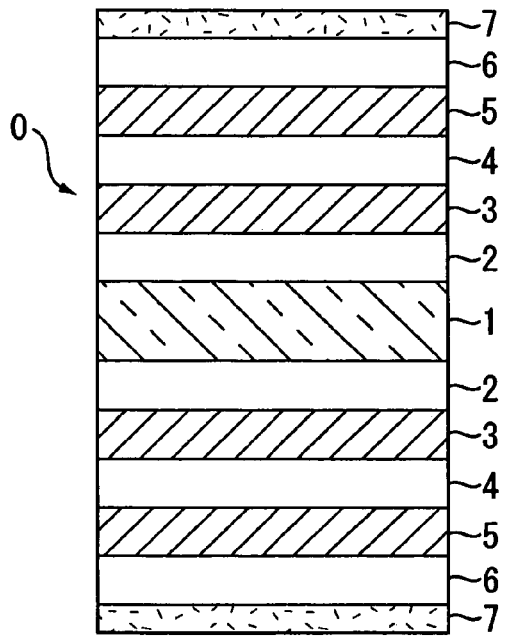

FIGS. 2(A), 2(B) and 2(C) present schematic sectional views showing other embodiments of the ND filter according to the present invention. For ease of understanding, the mutual corresponding parts in FIGS. 2(A), 2(B) and 2(C) and FIG. 1 are designated by the same reference numerals while FIG. 1 shows the first embodiment. An embodiment shown in FIG. 2(A) is basically the same as the embodiment shown in FIG. 1, but differs from it in that a carbon film 7' is also formed on the reverse side of the transparent substrate 1. In this manner, cladding both sides of the ND filter 0 with the carbon films 7 and 7' can more effectively fortify the abrasion resistance and the anti-electrostatic property.

An embodiment shown in FIG. 2(B) is basically the same as the embodiment shown in FIG. 2(A), but differs from it in that an under coat film 8 is inserted between the transparent substrate 1 and the carbon film 7'. When a plastic film is used for the transparent substrate 1, the carbon film 7' may not always be able to be firmly adhered to the reverse side of the substrate 1. To solve this problem, the undercoat film 8 is used to increase the adherence. For example, an SiC (silicon carbide) film can be used as the undercoat base film 8. The SiC film can be deposited by means of the plasma CVD method or the sputtering method, for example.

An embodiment shown in FIG. 2(C) forms the same layer structure on both sides of the transparent substrate 1. This embodiment can suppress unnecessary reflection on both sides. Each layer configuration is the same as that of the embodiment shown in FIG. 1.

Figure 3:
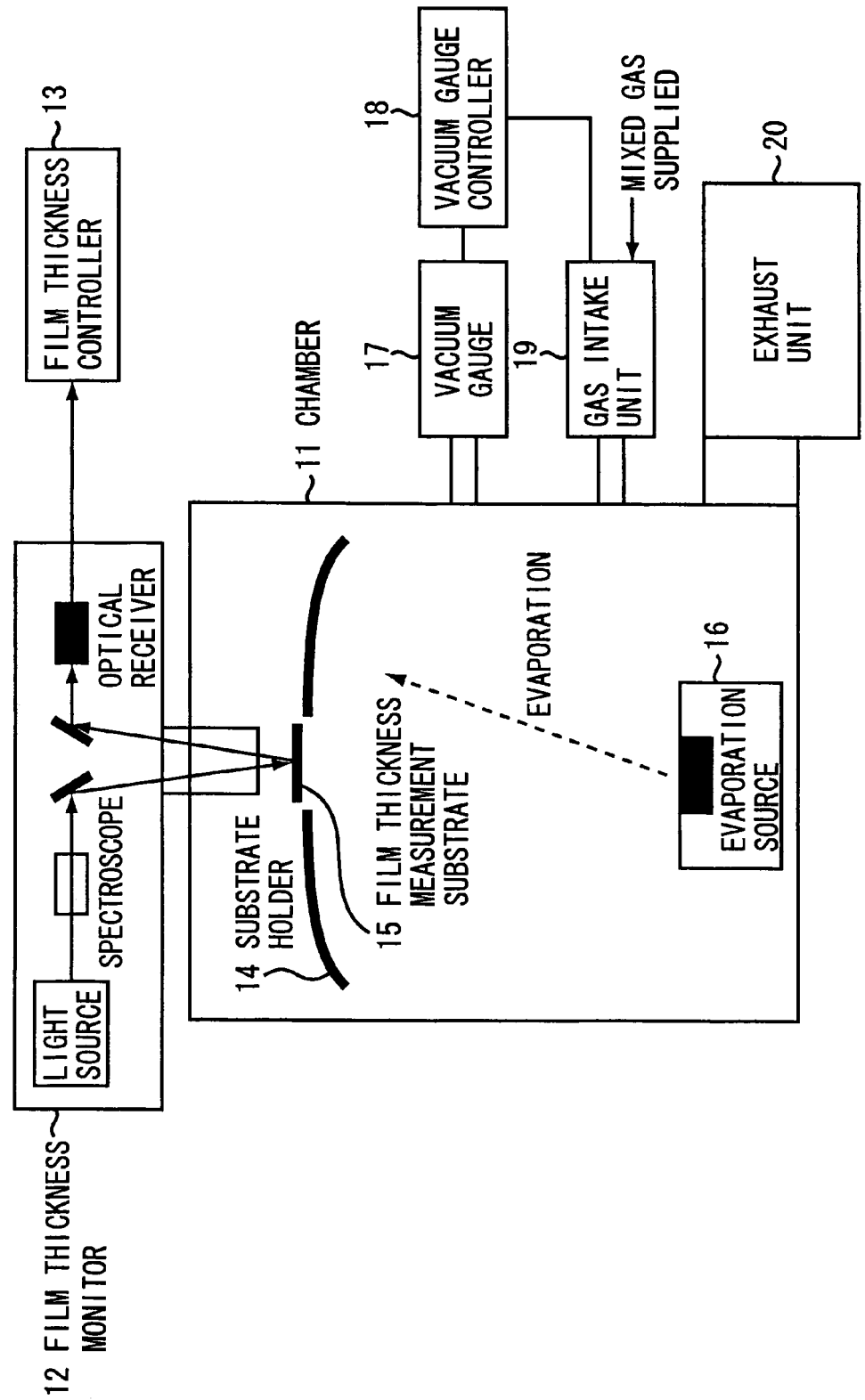
FIG. 3 is a schematic block diagram showing a vacuum evaporating apparatus used for fabrication of the ND filter according to the present invention.

The ND filter according to the present invention can be fabricated using the evaporation method, the sputtering method, or the CVD method. For example, the evaporation method can be used to fabricate the laminate of the dielectric film and the light-absorbing film. The CVD method can be used to fabricate the carbon film. However, the present invention is not limited thereto. While an appropriate PVD deposition method and an appropriate CVD deposition method can be used, the low-temperature process is preferable from the viewpoint of the heat resistance of the transparent substrate. FIG. 3 is a schematic block diagram exemplifying a vacuum evaporator apparatus used to fabricate the laminate of the ND filter as shown in FIG. 1. As shown in FIG. 3, the vacuum evaporator apparatus is mainly constructed of a vacuum chamber 11. A film thickness monitor 12 and a film thickness controller 13 are attached thereon. The chamber 11 contains a substrate holder 14 to support and fix a substrate to be processed, a film thickness measurement substrate 15, and an evaporation source 16. The film thickness monitor 12 is equipped with a spectroscope and an optical receiver (photosensor). The light emitted from the spectroscope enters into the film thickness measurement substrate 15. The reflected light enters into the optical receiver. The output is supplied to the film thickness controller 13. In this manner, the film thickness is realtime monitored to deposit light-absorbing films or dielectric films with desired thicknesses on the substrate.

The chamber 11 connects with a vacuum gauge 17, a vacuum gauge controller 18, a gas intake unit 19, and an exhaust unit 20. The embodiment uses the APC system to keep the degree of vacuum in the chamber 11 constant. Specifically, a feedback is applied via the vacuum gauge 17 and the vacuum gauge controller 18 to control the gas intake unit 19 and adjust the amount of mixed gas supplied into the chamber 11. However, the present invention is not limited thereto. It may be preferable to constantly regulate the amount of supplied gas using a needle valve.

FIG. 4 lists deposition conditions for fabricating the laminate of the ND filter shown in FIG. 1 using the vacuum evaporator apparatus in FIG. 3. As shown in the list, the substrate temperature is set to 100° C. The chamber's ultimate vacuum is set to $1 \times 10^{-3}$ Pa. In order to deposit the light-absorbing films 3 and 5, pure metal Ti is used as a raw material. The evaporation rate is set to 0.5 through 1.0 nm/sec. Reactive gas is supplied during the evaporation of Ti. As the reactive gas, the embodiment uses air by mixing nitrogen and oxygen at a ratio of 4:1. However, the present invention is not limited thereto. It is a general practice to use mixed gas containing oxygen at a ratio of 50% or less. For example, it is possible to use mixed gas of $O_2$ and Ar instead of mixed gas of $O_2$ and $N_2$. When the mixed gas containing oxygen is supplied, the evaporation vacuum is set to 3 through $4 \times 10^{-3}$ Pa. However, the present invention is not limited thereto. Generally, when the evaporation vacuum is maintained to be constant in the range between $1 \times 10^{-3}$ Pa and $1 \times 10^{-2}$ Pa, it is possible to deposit a light-absorbing film that has excellent optical characteristics and physical characteristics, containing metal and its saturated oxide as the major components, thereby suppressing a ratio of the residual lower oxides of Ti. In case that the dielectric films 2, 4, and 6 are deposited, $SiO_2$ is used as an evaporation source. The evaporation rate is set to 0.5 through 1.0 nm/sec. When $SiO_2$ is deposited, no reactive gas is supplied particularly. The embodiment uses the vacuum evaporation to form light-absorbing films. Instead, it may be preferable to use other PVD deposition methods such as the ion plating method, the ion assist method, and the sputter method that can form fine films.

Figure 5:
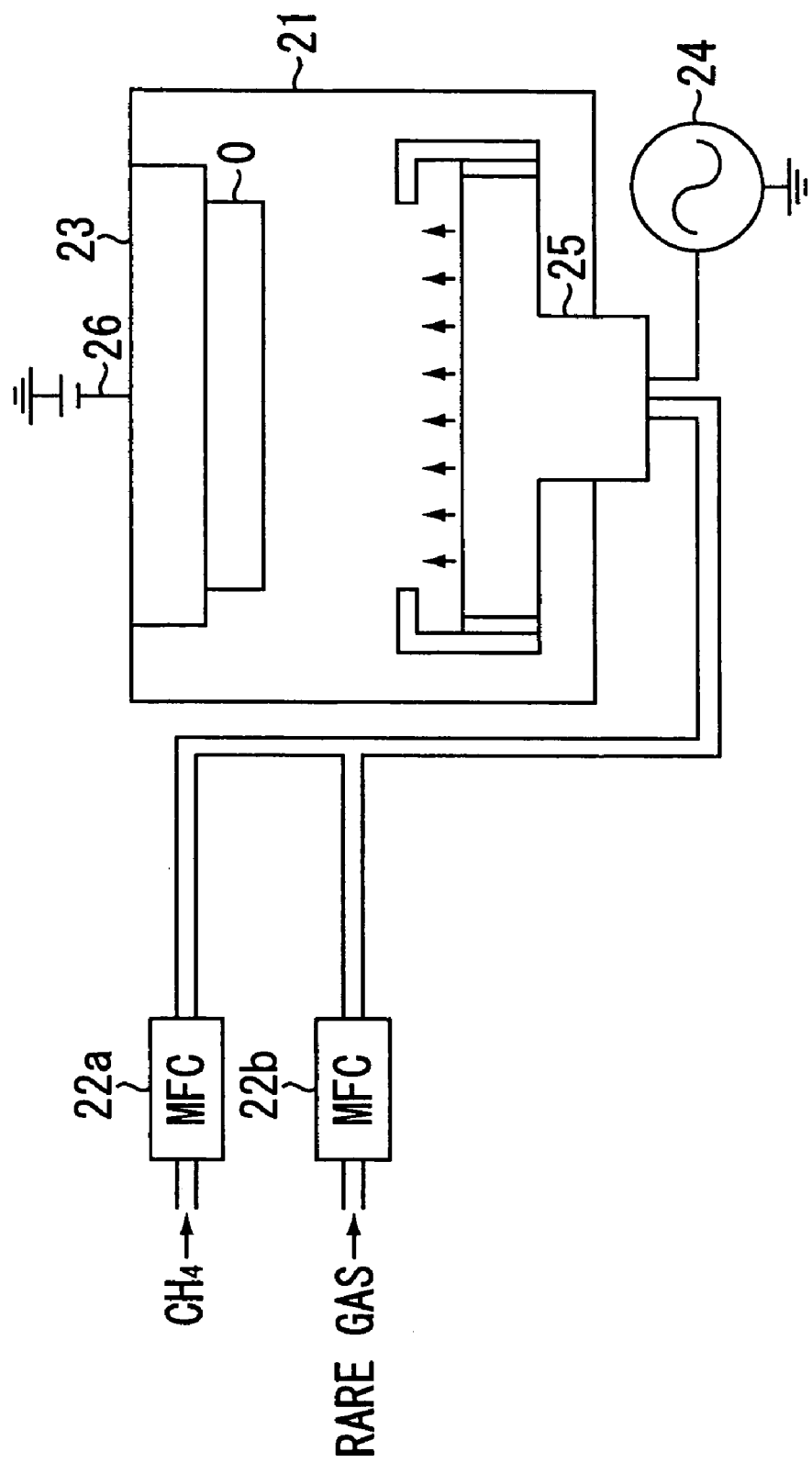
FIG. 5 is a schematic block diagram showing a parallel-plate CVD apparatus used for fabrication of the ND filter according to the present invention.

FIG. 5 is a schematic block diagram showing a plasma CVD apparatus used to deposit the carbon film as a protective film for the ND filter in FIG. 1. As shown in FIG. 5, the plasma CVD apparatus is composed of a chamber 21, mass flow controllers (MFC) 22a and 22b, a first electrode 23, an RF power supply 24, a second electrode 25, and a direct current bias power supply 26. A pair of electrodes 23 and 25 are disposed opposite to each other to constitute a so-called parallel-plate plasma CVD apparatus.

With further reference to FIG. 5, the following describes the carbon film deposition method. As a preparatory step, a semi-finished product of the ND filter 0 is placed on the surface of the electrode 23. In this state, the chamber 21 is supplied with $CH_4$ as source gas at a flow rate of 100 sccm and is supplied with auxiliary discharge gas, i.e., rare gas such as He at a flow rate of 100 sccm to maintain the pressure inside the chamber 21 to be 5 Pa. The mass float controllers 22a and 22b adjust flow rates of the $CH_4$ gas and the rare gas, respectively.

The first electrode 23 connected with the semi-finished product of the ND filter 0 to be processed is supplied with −300 V of a substrate bias voltage output from the direct current bias power supply 26. The RF power supply 24 supplies the second electrode 25 with high-frequency power at the 13.56 MHz frequency to generate plasma. In this manner, the plasma occurs near the second electrode 25. Then, the C (carbon) ion in the plasma moves to the semi-finished part of the ND filter 0 to form a hard DLC film on its surface. The auxiliary discharge gas is not limited to He and can be any rare gas. For example, it is possible to use Ne or mixed gas of He and Ne. Further, it may be preferable to mix Ar gas with gas of an element having a smaller mass number and use this mixed gas as the auxiliary discharge gas.

Figure 6:
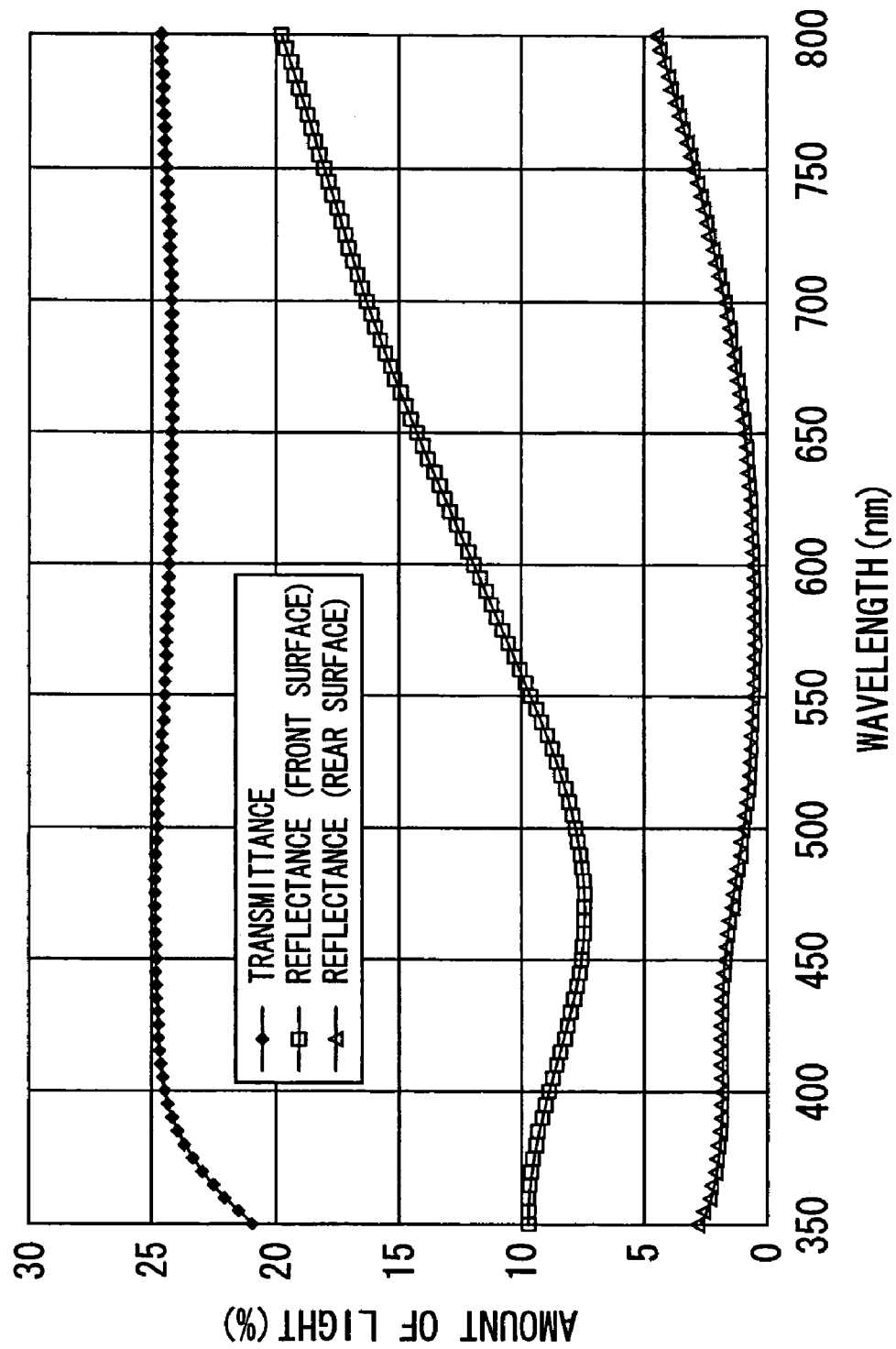
FIG. 6 is a graph showing optical characteristics of the ND filter according to the present invention.

FIG. 6 is a graph showing optical characteristics of the ND filter fabricated as mentioned above. The abscissa shows wavelengths in a visible range. The ordinate shows the amounts of reflecting light (%) and transmitting light (%). As clearly understood from the graph, the ND filter indicates neutral transmission characteristics in the visible range. We have succeeded in fabricating the ND filter with the low suppressed reflectance on the surface. Further, we have placed the ND filter to an environmental test and found that the ND filter indicated very excellent resistance. Depending on cases, it may be preferable to conduct the heat treatment in an oxygen atmosphere so as to stabilize unstable components such as lower oxide contained in the light-absorbing film.

Figure 7:
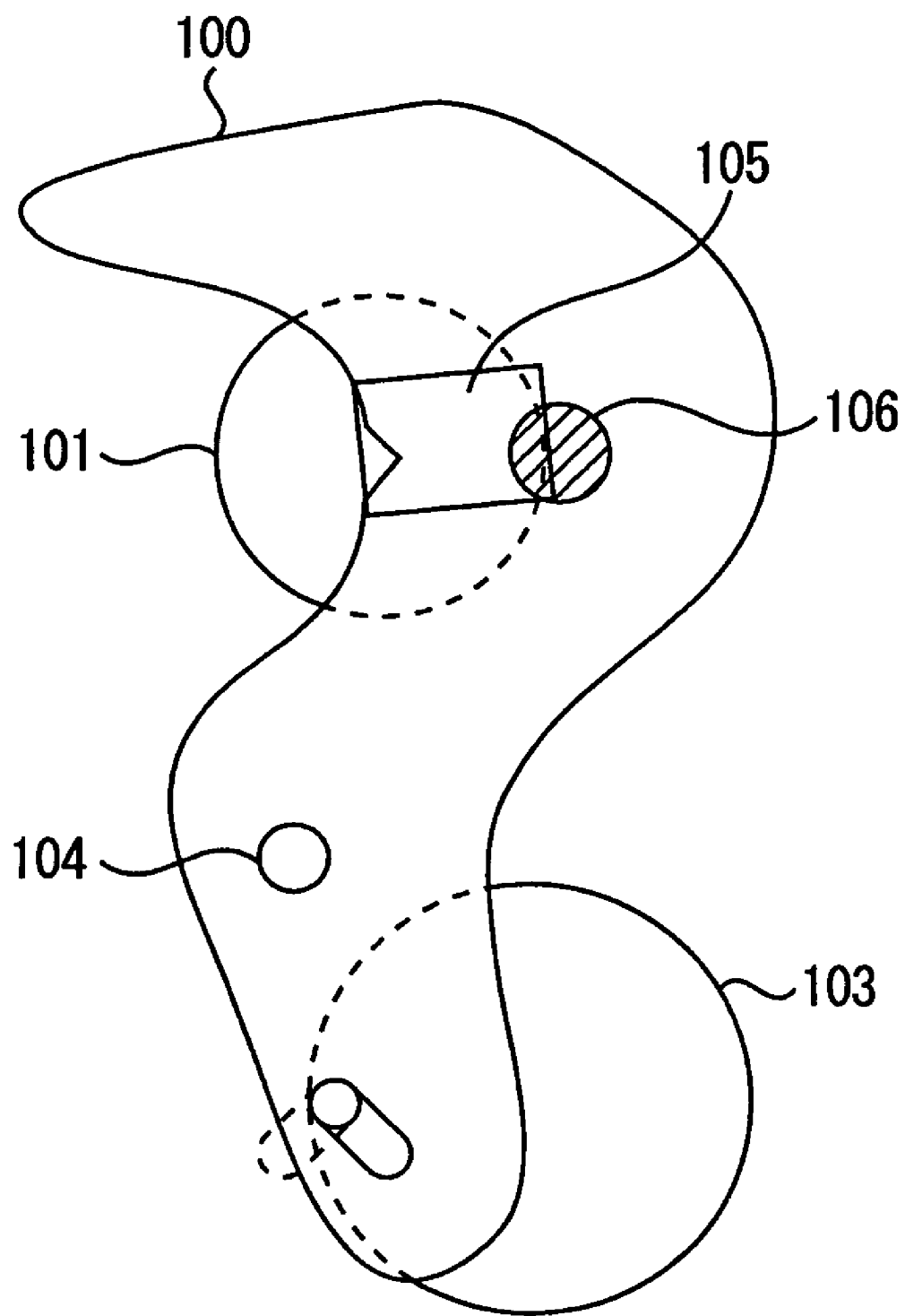
FIG. 7 is a schematic diagram showing the ND filter according to the present invention applied to an aperture device for cameras.

FIG. 7 is a schematic diagram showing the ND filter applied to an aperture device for cameras. An aperture diaphragm 100 represents one of a pair of aperture blades mounted. An ND filter 105 is fixed to a recess of the aperture blade 100 by means of adhesive 106 or hot welding. The aperture blade 100 is constructed to rotatively move around a pin 104 by means of a drive unit 103 such as motor, and to open and close an aperture 101.

What is claimed is:

1. An ND filter comprising:
   a transparent substrate;
   a light-absorbing film and a dielectric film laminated on the transparent substrate;
   a first carbon film formed to clad a surface of a laminate of the light-absorbing films and the dielectric films;
   a second carbon film formed on a reverse side of the transparent substrate, which is opposite to a front side of the transparent substrate where the laminate is formed, and
   an undercoat film inserted between the transparent substrate and said second carbon film.

2. The ND filter according to claim 1, wherein the carbon film is formed by a deposition process at a deposition temperature ranging from a room temperature to 150° C.

3. The ND filter according to claim 1, wherein the light-absorbing film comprises a mixture of metal and a compound of the metal, a material of the metal being selected from a group consisting of Ti, Cr, Ni, NiCr, NiFe, and NiTi.

4. The ND filter according to claim 1, wherein the dielectric film comprises $SiO_2$ or $Al_2O_3$.

5. The ND filter according to claim 1, wherein the transparent substrate comprises a resin film transparent in a visible wavelength range.

6. The ND filter according to claim 1, wherein the light-absorbing film comprises a mixture of metal and a compound of the metal, a material of the metal being selected from a group consisting of Ti, Cr, Ni, NiCr, NiFe, and NiTi, and wherein the dielectric film comprises $SiO_2$ or $Al_2O_3$.

7. An aperture device using the ND filter according to claim 6.

8. An aperture device using the ND filter according to claim 1.

9. The ND filter according to claim 1, wherein the undercoat film is composed of SiC.

* * * * *